United States Patent [19]
Nishiyama

[11] Patent Number: 5,857,420
[45] Date of Patent: Jan. 12, 1999

[54] METHOD OF INCINERATING AND MELTING WASTES AND APPARATUS THEREFOR

[75] Inventor: Shinroku Nishiyama, Takaraza, Japan

[73] Assignee: Nippon Metal Co., Ltd., Osaka, Japan

[21] Appl. No.: 506,497

[22] Filed: Jul. 25, 1995

[30] Foreign Application Priority Data

| | | | |
|---|---|---|---|
| Jul. 27, 1994 | [JP] | Japan | 6-207908 |
| Aug. 21, 1994 | [JP] | Japan | 6-231995 |
| Aug. 22, 1994 | [JP] | Japan | 6-233999 |
| Nov. 16, 1994 | [JP] | Japan | 6-321799 |
| Jan. 31, 1995 | [JP] | Japan | 7-050297 |
| Apr. 14, 1995 | [JP] | Japan | 7-125556 |

[51] Int. Cl.$^6$ .................................................. F23G 7/00
[52] U.S. Cl. ........................... 110/346; 110/345; 110/259; 110/165 R; 110/246
[58] Field of Search ............................ 110/346, 246, 110/226, 345, 259, 235, 165 R

[56] References Cited

U.S. PATENT DOCUMENTS

| | | | |
|---|---|---|---|
| 4,986,197 | 1/1991 | Kent | 110/246 |
| 5,081,940 | 1/1992 | Motomura et al. | 110/346 |
| 5,237,940 | 8/1993 | Pieper et al. | 110/246 X |
| 5,385,104 | 1/1995 | Binner | 110/246 |
| 5,560,304 | 10/1996 | Duchateau et al. | 110/246 X |
| 5,561,917 | 10/1996 | Ratajczek | 110/226 X |

*Primary Examiner*—Henry A. Bennett
*Assistant Examiner*—Susanne C. Tinker
*Attorney, Agent, or Firm*—Edwin E. Greigg; Ronald E. Greigg

[57] ABSTRACT

The method of an apparatus for incinerating and melting wastes along with incombustible materials in the wastes which comprise introducing wastes in a horizontal rotary furnace, incinerating the wastes at a temperature from 800° C. to 1,200° C., and melting the ashes of the wastes together with the remaining products which are vitrified at a temperature of more than 1,600° C., by an oxygen type burner in which an oxygen-fuel mixture has an oxygen content of 50% in the mixture. The exhaust gas generated in the incineration and melting processes is introduced to a dust collector for cleaning the exhaust gas.

13 Claims, 7 Drawing Sheets

METHOD OF INCINERATING AND MELTING WASTES AND APPARATUS THEREFOR

BACKGROUND OF THE INVENTION (1) Field of the Invention

The present invention relates to a method of incinerating and melting wastes and an apparatus therefor, and particularly to the method and apparatus for incinerating and melting a combustible material, such as a waste of plastic products, paper products, wood, or rubber products and an incombustible material including metal products.

(2) Prior Art

In recent years, the amount of urban wastes generated for disposal has greatly increased due to a change of life style and the migration of the population toward towns and cities.

The most important problem for waste disposal lies in reducing its volume. Another problem lately has been the presence in urban wastes of harmful materials. Because an effluence of harmful materials from the wastes may occur if wastes are buried underground, the tendency has been to incinerate them.

Normally, the ashes of the urban wastes, including those (such as fly ashes) collected by a bag-filter of a collector, were disposed of in such a manner that they were buried underground in reclaimed land or underground during engineering and construction at the time of performing concrete work.

However, these ashes are fine powders which absorb dioxins and include incombustible heavy metals, and therefore it costs substantially to transfer the ashes since there is a great possibility that the ashes may become scattered in the wind when treating and transferring the same. Furthermore, where the ashes are simply buried underground, the harmful materials included in or absorbed in the ashes are washed therefrom due to rain and underground water so as to cause pollution. Therefore, it is required that disposal of the ashes should be carried out carefully.

Recently, laws and rules concerning disposal of urban and industrial wastes are provided, so that it becomes a legal responsibility that the ashes of the wastes must be disposed of via a second treatment after incineration.

As a method of further decreasing the volume of the ashes and resolving the harmful materials so as to prevent the harmful materials from washing out, the ashes are melted. As methods of melting the ashes, a plasma-electric melting, a high-frequency electric melting, and a heat melting by a burner have all been tried.

As mentioned above, it is difficult technically to use the electric furnace since the objects to be incinerated and melted are mostly nonferrous materials. The plasma-electric furnace is very expensive on a large scale and has an increased installation cost.

Therefore, there have been attempts to melt the ashes by means of a conventional heat furnace having a burner which uses a gaseous, liquid or solid fuel. Such a burner type heating means has become popular recently since it has advantages of generation of a high temperature, a high heat efficiency, a low running cost and ease of burning control.

The burner uses LPG, NLG or other fuels, and the air for burning the fuel is supplied by means of an air compressor such as a centrifugal turbine pump or a vane pump and then mixed with the fuel.

This manner of combustion may generate a high temperature which melts the waste ashes, but it is difficult to control generation of a CO gas. Generation of the CO gas means that dioxins, which are closely connected with the CO gas, cannot be controlled.

A conventional waste reduction process is based on the idea that incineration of the wastes is carried out in another process which is quite different from a melting process. As the result, there are further problems in that it is necessary to provide two disposal installations, one for incinerating the wastes and the other for melting the ashes, and the costs for transfer of the wastes and ashes and also the fuel costs become very expensive.

Further, the molten object or slag are fragile after cooling the same and therefore there is no means of disposal except that they should be abandoned at a reclaimed landfill and buried underground.

SUMMARY OF THE INVENTION

An object of the present invention is to reduce the volume of the wastes through incineration and melting with a low cost of fuel, to resolve dioxins at a high temperature and to more easily carry out a disposal of the molten material which is vitrified.

To achieve the above object, the method of incinerating and melting wastes according to the present invention comprises the steps of:

introducing wastes, by means of waste introduction means, from one opening of a pair of openings provided on opposite ends of a rotary furnace, incinerating the wastes at a temperature from 800° C. to 1,200° C., by means of an oxygen type burner for using an oxygen gas having a density of more than 50% oxygen and a fuel, so as to reduce their volumes, introducing additional wastes into the furnace and incinerating the same, repeating introduction of wastes and incineration thereof for a plurality of times, melting ashes of the wastes pooled in the rotary furnace at a high temperature of more than 1,600° C., to be vitrified, discharging the vitrified ashes from an outlet opening of the rotary furnace for disposal, and introducing an exhaust gas generated in the incinerating and melting processes from said outlet opening to a dust collector for cleaning the same.

It is preferable to add at least a soda ash ($Na_2CO_3$) at the time of the melting step.

Further, it is preferable to add at least one solid fuel selected from coke, coal and charcoal in the form of powder or lump, prior to the incinerating step or the melting step for assisting the incineration and melting.

Furthermore, to achieve the above object, the method of incinerating and melting wastes according to the present invention comprises the steps of:

introducing wastes, by means of a waste introduction means, into an inlet of a furnace opening provided with an outlet opening at an opposite end of the rotary furnace, incinerating the wastes at a temperature from 800° C. to 1,200° C., by means of an oxygen type burner for using an oxygen gas having a density of more than 50% oxygen and a fuel, so as to reduce the volume of the waste, introducing additional wastes into the furnace and incinerating the same, repeating introduction of wastes and incineration thereof for a plurality of times, transferring the ashes of the wastes and any remaining particles to a melting furnace, melting the ashes of the wastes and remaining particles at a high temperature of more than 1,600° C., to be vitrified, discharging the molten object for disposal, and introducing an exhaust gas generated in the incinerating and melting processes from the outlet opening of the rotary furnace and an opening of the melting furnace to a dust collector for cleaning the same.

To achieve the above object, the apparatus for incinerating and melting wastes according to the present invention comprises:

a rotary furnace provided to be rotatable about a longitudinal axis thereof and to be tiltable about a horizontal axis which crosses the longitudinal axis at a right angle said rotary furnace having an inlet opening and an outlet opening at an opposite end thereof, waste introducing means for transferring and supplying wastes into the rotary furnace through the inlet opening thereof, so as to repeat introduction of waste and incineration of the wastes for a plurality of times, an oxygen type burner for using an oxygen gas of 50% density and a fuel, provided at the inlet end of the rotary furnace to open and close the inlet opening thereof, said burner being constructed to melt the ashes of the wastes at a temperature of more than 1,600° C., to be vitrified, and a dust collector connected to an exhaust duct which is connected to the outlet opening of the rotary furnace for cleaning an exhaust gas generated through incineration and melting processes.

It is preferable to introduce at least a soda ash ($Na_2CO_3$) at the time of the melting step by mixing same with the wastes.

Further, it is preferable to add at least one solid fuel selected from coke, coal and charcoal in the form of powder or lump, prior to the incinerating step or the melting step for assisting the incineration and melting.

Furthermore, it is preferable to provide a crusher for crushing the wastes prior to the waste introducing step.

To achieve the above object, the apparatus for incinerating and melting wastes according to the present invention comprises:

a rotary furnace provided to be rotatable about a cylindrical axis thereof and to be tiltable about a horizontal axis which crosses the cylindrical axis at a right angle, said rotary furnace having an inlet opening at one end and an outlet opening at an opposite end thereof, waste introducing means for transferring and supplying wastes into the rotary furnace through the inlet opening thereof, so as to repeatedly introduce and incinerate the wastes for a plurality of times, an oxygen type burner for using an oxygen gas of 50% density oxygen and a fuel is provided at the inlet end of the rotary furnace to open and close the inlet opening thereof, a melting furnace for receiving the wastes and the remaining particles from the rotary furnace for melting the same, a melting oxygen type burner for using an oxygen gas of 50% density oxygen and a fuel, provided with the melting furnace and constructed to melt the ashes of the wastes and the remaining particles at a temperature of more than 1,600° C., to be vitrified, and a dust collector connected to an exhaust duct which is connected to the outlet opening of the rotary furnace and another exhaust duct which is connected to the opening of the melting furnace for cleaning the exhaust gas generated through incineration and melting processes.

Now, functions of the present invention will be described.

According to the present invention, it becomes possible not only to repeatedly introduce and incinerate the wastes by means of the oxygen type burner using an oxygen gas containing oxygen of 50% density, so as to reduce their volume, but also to melt the ashes of the wastes when the ashes are to be stored until reaching a predetermined amount.

At the time of incineration of the wastes, it becomes possible to expect a more complete incineration of the wastes by utilizing the oxygen type burner using an oxygen gas containing 50% density of oxygen, so as to increase a density of oxygen in the atmosphere of the rotary furnace and to produce an exhaust gas which has a low density of CO gas while resolving dioxins at a high temperature of from 800° C. to 1,200° C. Therefore, it is possible to control dioxins even though the exhaust gas is discharged in the air through the dust collector.

Further, by repeatedly reintroducing the wastes and incineration thereof, it becomes possible not only to carry out reduction of their volumes, but also to preheat the rotary furnace with the combustible wastes, particularly any kinds of plastic rubbish having a high heating power, so as to save a fuel cost for increasing the temperature of the rotary furnace for melting the ashes of the wastes.

Furthermore, by means of the oxygen type burner which may generate a very high temperature, it becomes possible to heat and melt the ashes, which are stored to a predetermined amount, together with the soda ash, at a temperature of more than 1,600° C., so as to be vitrified. At the time of the melting, since the oxygen type burner uses an oxygen gas containing at least 50% density of oxygen, oxygen may be increased to a higher level in the rotary furnace so as to lower the level of CO in the exhaust gas. This means that it is possible to prevent the harmful materials, which are produced due to the CO gas and included in the exhaust gas from discharging via the dust collector.

Incombustible materials other than the ashes, such as metal, can be melted at the very high temperature and involved in the vitrified ashes.

Now, advantages of the present invention will be described.

The present invention has the advantages of reducing the volume of the wastes by repeating introduction of the wastes and incineration thereof for a plurality of times utilizing a single rotary furnace and greatly saving a heating cost of the rotary furnace at a high temperature (about more than 1,600° C.) with the heating power of the wastes for the next melting step.

Further, since incineration and melting of the wastes are carried out by means of an oxygen type burner using an oxygen gas containing at least a 50% density of oxygen, it becomes possible not only to incinerate the fuel (for example an LPG) completely, but also reduce generation of CO by increasing the density of oxygen in the rotary furnace so as to prevent production of dioxins and resolve the dioxins through the incineration and melting at a very high temperature so that scattering of the harmful materials in the ashes may be prevented.

Furthermore, the ashes and the remaining materials can be vitrified at a very high temperature (about more than 1,600° C.) and the molten material may prevent the harmful materials involved therein from washing out underground due to rain and underground water where the molten material is buried underground.

Other objects and advantages of the present invention will be understood from the description of the embodiment on the basis of the drawings.

BRIEF DESCRIPTION OF THE DRAWINGS

The drawings show a preferred embodiment of a method of incinerating and melting wastes and an apparatus therefor, wherein.

DETAILED DESCRIPTION OF THE EMBODIMENTS

Figure 1:
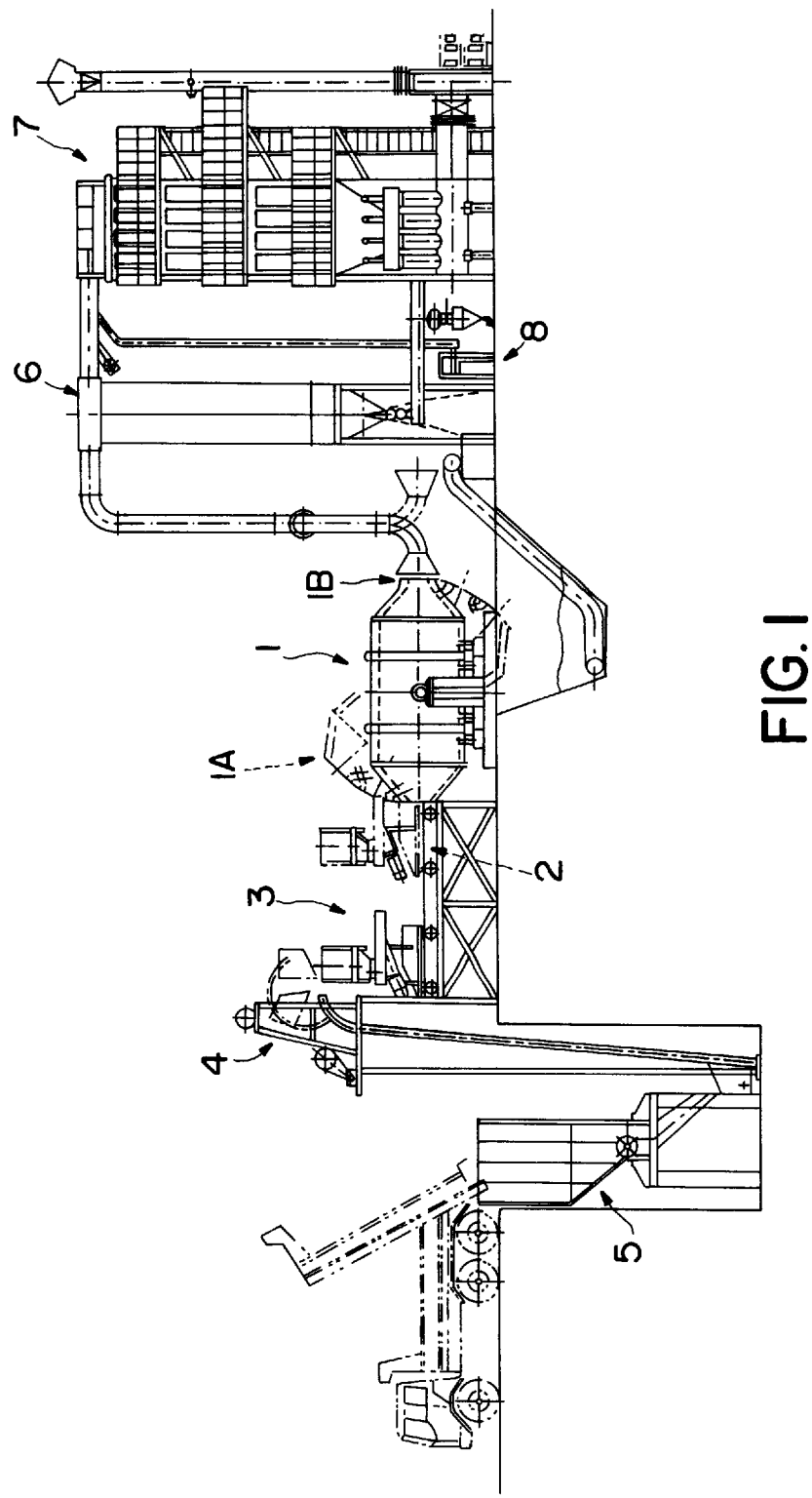
FIG. 1 is a vertical view of an arrangement plan of the apparatus for incinerating and melting the wastes according to a first embodiment.

The first embodiment of a method of incinerating and melting wastes and an apparatus therefor according to the present invention will be described in detail with reference to the drawings.

The method of the invention comprises the steps of introducing wastes, by means of a waste introducing device 3 into one waste input opening 1a at one end of a rotary furnace opening 1b provided having an output at another end of the rotary furnace 1, incinerating the wastes at a temperature from 800° C. to 1,200° C., by means of an oxygen type burner 2 using an oxygen gas having a density of more than 50%, and a fuel such as an NLG or an LPG, so as to reduce the volume of the waste, introducing waste after reduction of their volume and incinerating the same, repeating introducing wastes and incineration thereof for several times, thereafter melting ashes of the wastes pooled in the rotary furnace 1 by means of the oxygen type burner 2 at a high temperature of more than 1,600° C., so that the remaining ashes (the residue) may be vitrified during reduction of the waste, incinerating the same and melting step, and introducing an exhaust gas generated in the incinerating and melting processes from the opening 1b of the rotary furnace 1 to a dust collector 7 for cleaning the same, and directing the vitrified ashes from the outlet opening 1b of the rotary furnace for disposal by tilting the furnace vertically at a right angle to its horizontal axis and emptying the vitrified material.

It is preferable that the melting temperature should be more than 1,600° C., in order to vitrify the ashes completely, but it is sufficient that the temperature reaches around the said value since vitrification may be varied according to some conditions.

It is also preferable to introduce the materials which mix well with the wastes, soda ash ($Na_2CO_3$), glass collets, and limestone, so as to achieve a good vitrification.

In the above method, it is possible to introduce at least one of the solid fuels such as coke, coal or charcoal at the time of introducing the wastes.

The combined use of the solid fuel saves the consumption of oxygen and LPG at the time of incineration and melting of the wastes.

It is important to lower the cost of the expensive oxygen and LPG, since it is not necessary to increase the temperature for incineration of the waste other than the temperature for melting.

Of course, the solid fuel may be utilized in the melting process as an assistive energy source in order to increase the temperatures of the rotary furnace and ashes.

Now, the apparatus for incinerating and melting the wastes according to the invention will be described. FIG. 1 shows an arrangement plan of the apparatus and FIG. 2 is a sectional side view of the rotary furnace.

Figure 2:
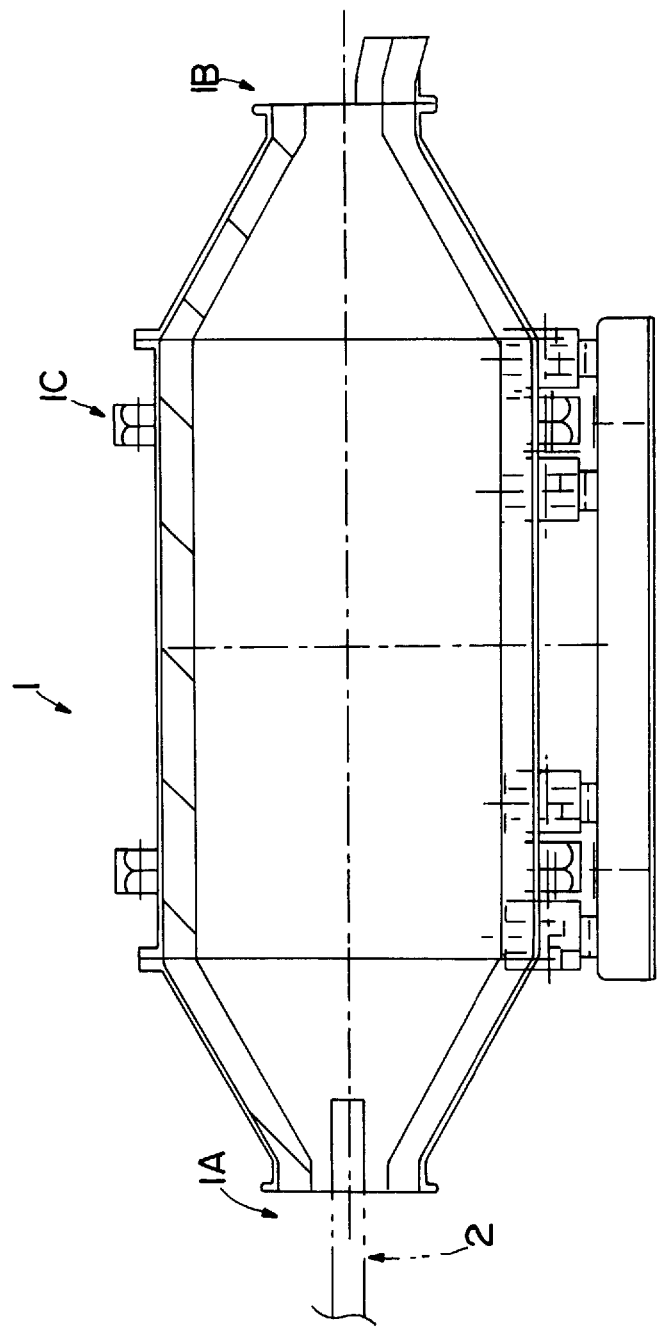
FIG. 2 is a sectional side view of a rotary furnace according to the first embodiment.

The numeral 1 refers to a rotary furnace and its detailed construction is as shown in FIG. 2. Namely, the rotary furnace 1 has an input opening 1a and an output opening 1b at opposite ends thereof and is rotatable about a longitudinal axis thereof and can be tiltable about a horizontal axis which crosses the cylindrical axis at a right angle (See the phantom lines in FIG. 1). A firebrick liner, which has a heat resistance to the temperature of more than 1,600° C. employed at the time of melting the ashes of the wastes, is provided on an inside wall of the rotary furnace 1.

As shown in FIG. 1 (omitted in FIG. 2), an oxygen type burner 2, which uses an oxygen gas having a 50% density of oxygen and fuel, is provided at the opening 1a of the rotary furnace 1 to open and close the opening 1a. The construction of the burner 2 is well known and therefore its detailed description is omitted here. Tilting of the rotary furnace 1 is carried out in order to discharge the molten and vitrified material from the opening 1b after finishing melting. The oxygen type burner 2 is removed from the opening 1a when the materials including the wastes and additives are introduced into the rotary furnace 1. The numeral 1c shows supporting rails for rotation of the rotary furnace 1.

The numeral 3 refers to a waste introduction device for transferring and supplying the wastes into the rotary furnace 1 in such a state that the oxygen type burner 2 is moved to open the opening 1a.

The waste introduction device 3 is constructed to mix and add soda ash, limestone, glass collets and other materials including the ashes of the wastes transferred from other waste incineration places.

Further, as shown in FIG. 1, the waste introduction device 3 is so constructed as to move from a position facing the opening 1a of the rotary furnace 1 to a waste supplying position for introducing the waste into the furnace, as the waste introducing device 3, is inclined by means of an air cylinder, so that the rotary furnace 1 is tilted as the opening 1a turns upward.

The numeral 4 refers to a bucket lift for supplying the wastes to the waste introducing device 3 which is positioned in the waste supplying position. Beneath the bucket lift 4 a crusher 5 is arranged so that the waste conveyed by a dump truck may be dumped into the crusher 5 and crushed thereby and then the crushed wastes are supplied to the bucket.

A duct is oriented against the opening 1*b* of the rotary furnace 1 and an exhaust gas $SO_2$ is introduced to a cooling tower 6. After the exhaust gas is cooled in the cooling tower 6, it is introduced to a dust collector 7. In the path of the gas passing through the cooling tower 6 to the dust collector 7, a powder supplier 8 adds, for example, slaked lime to the exhaust gas so as to cause a reaction of the slaked lime with the material in the exhaust gas ($SO_2$).

The dust collector 7 is a type having a bag-filter the construction of which is well known, and therefore its detailed description is omitted here.

The materials for incineration and melting are urban wastes (combustible and incombustible materials), their ashes, shredder dust (such as processed automobile scrap) and so forth.

As mentioned above, since heat of the rotary furnace is continued from the state that the wastes are introduced and incinerated several times, 30–40% of the fuel cost for heating the rotary furnace 1 at a high temperature for melting can be saved.

Next, the second embodiment of the invention will be described.

Figure 3:
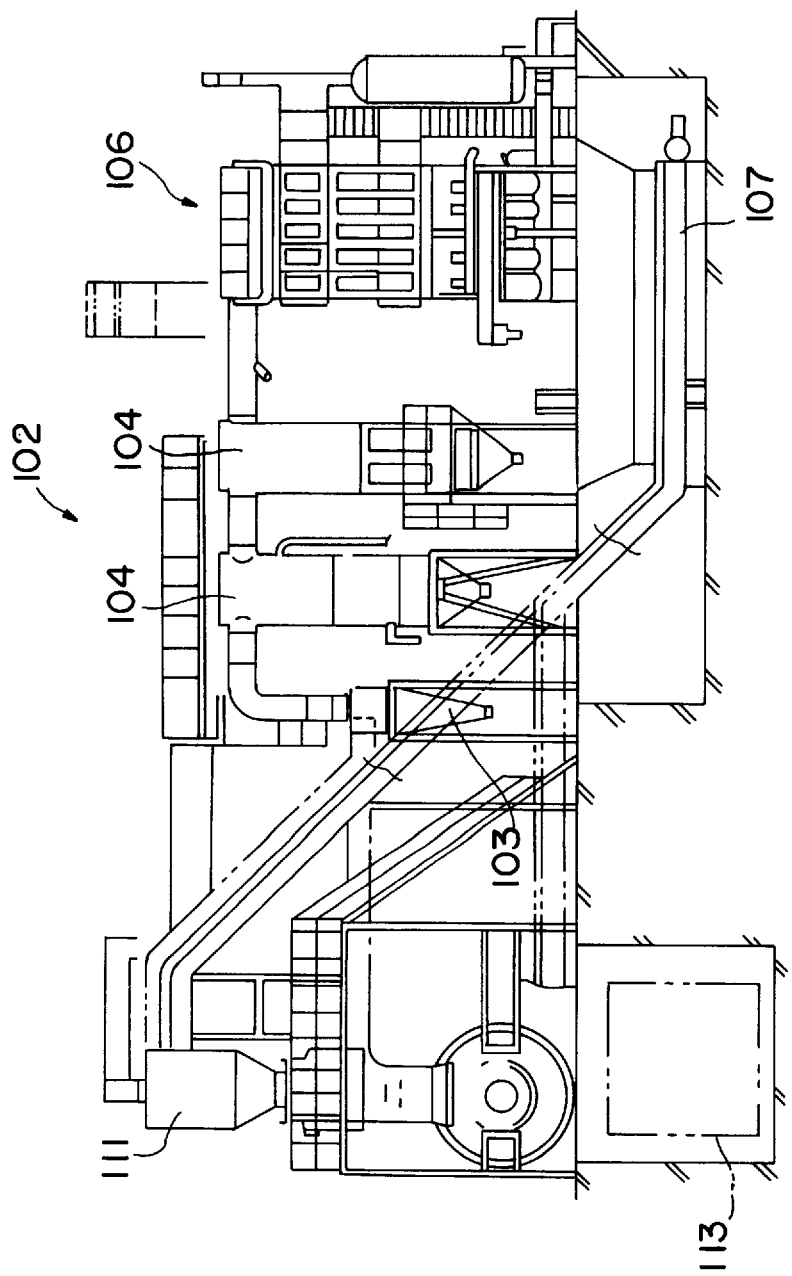
FIG. 3 is a front view of the apparatus for incinerating and melting the wastes according to a second embodiment.
Figure 4:
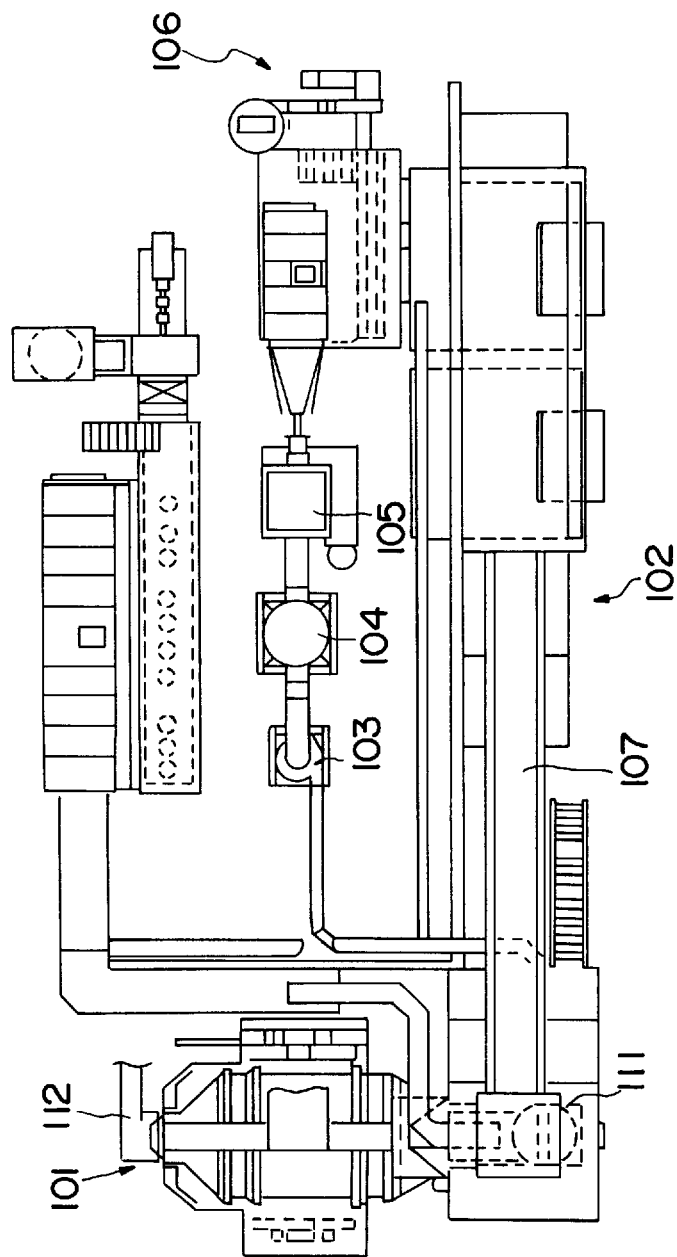
FIG. 4 is a plan view of the apparatus for incinerating and melting the wastes according to the first embodiment according to the second embodiment.

In this embodiment, the furnace for incineration and melting are separated from each other. FIGS. 3 and 4 show the apparatus for incineration and melting. The numeral 101 refers to a rotary furnace and its detailed construction will be described hereinafter on the basis of FIGS. 5 through 7. The materials for incineration and melting are, for example, urban wastes, the ashes thereof, shredder dusts (automobile scrap), and sludge form the river beds and sea beds. FIG. 4 shows a plan view of the apparatus for incinerating and melting the castes and FIG. 8 shows a state of discharging out the molten material or slag from the melting furnace.

As shown in FIGS. 3 and 4, the numeral 103 refers to a preduster filter to which the exhaust gas from the rotary furnace 101 and the dust in the exhaust gas is removed thereby. The preduster filter 103 has a well known construction using a mesh. The numeral 104 is a first cooling tower where the exhaust gas passing through the preduster filter 103 is cooled down a step with a water cooling function.

The numeral 105 refers to a second cooling tower for further cooling down the exhaust gas with a water cooling function and it is so constructed as to function as a desulfurizer by mixing and feeding the powder of unslaked lime into the gas. The numeral 106 refers to a dust collector which is a type of housing having a bag-filter for removing fine dust and fly ashes. The fine dust filtered by the bag-filter is made to fall down by means of a vibrator which operates periodically and then is collected to be transferred by a conveyor to a hopper arranged beside the melting furnace, which is described in detail hereinafter. Then, the fine dust is melted together with the ashes which are discharged from the rotary furnace 101. The section where such a removing operation is carried out is the same as the dust collector 102 in the present invention.

A density measuring instrument (not shown in the drawings) for measuring the density of oxygen in the exhaust gas, is provided with the duct which is connected to the dust collect 106 and the measured data are fed back and a control valve for an oxygen type burner, which is described in detail hereinafter, can be controlled by means of a controller so that the valve controlling the oxygen in the rotary furnace 101 normally produces a density which exceeds at least 6%.

Figure 5:
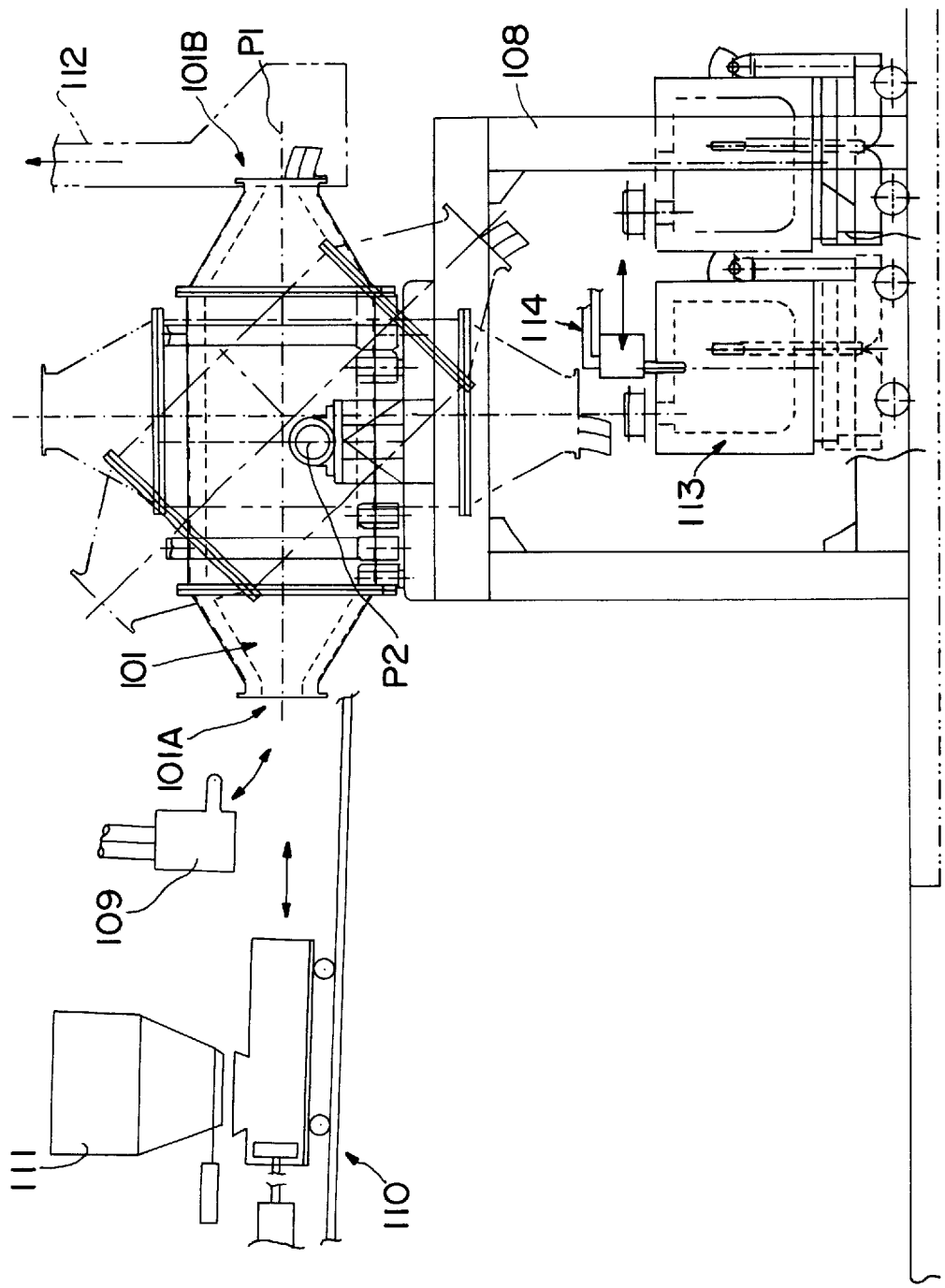
FIG. 5 is a front view showing operations of a rotary furnace and a melting furnace according to the second embodiment.
Figure 6:
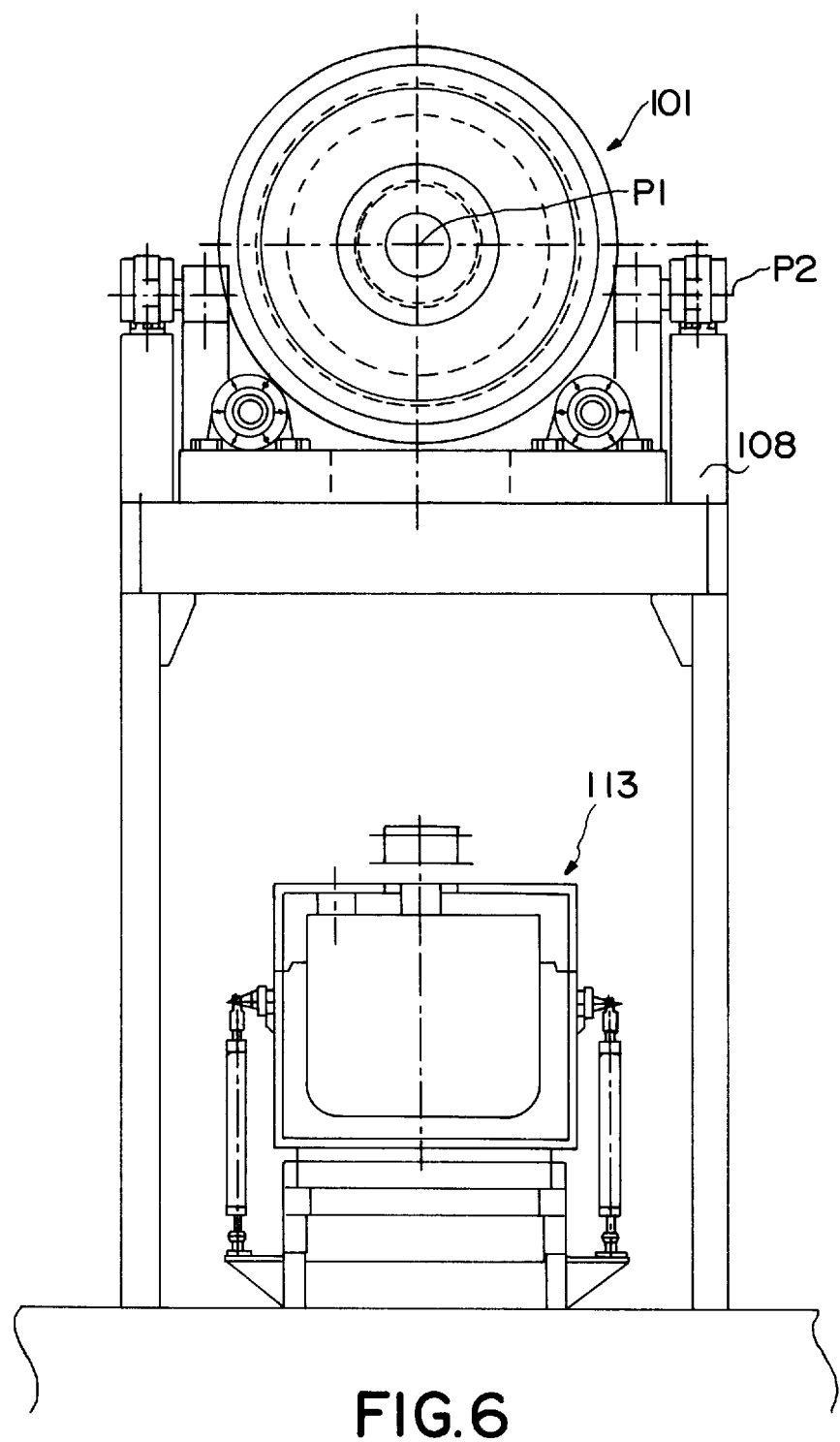
FIG. 6 is a side view of the rotary furnace and the melting furnace according to the second embodiment.
Figure 7:
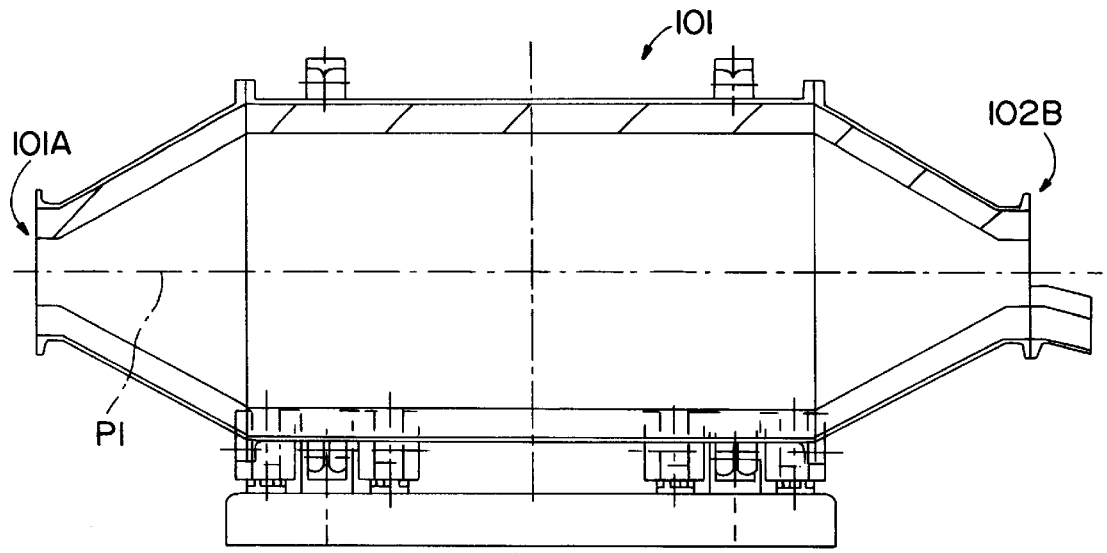
FIG. 7 is a sectional view of the essential portion of the rotary furnace according to the second embodiment.
Figure 8:
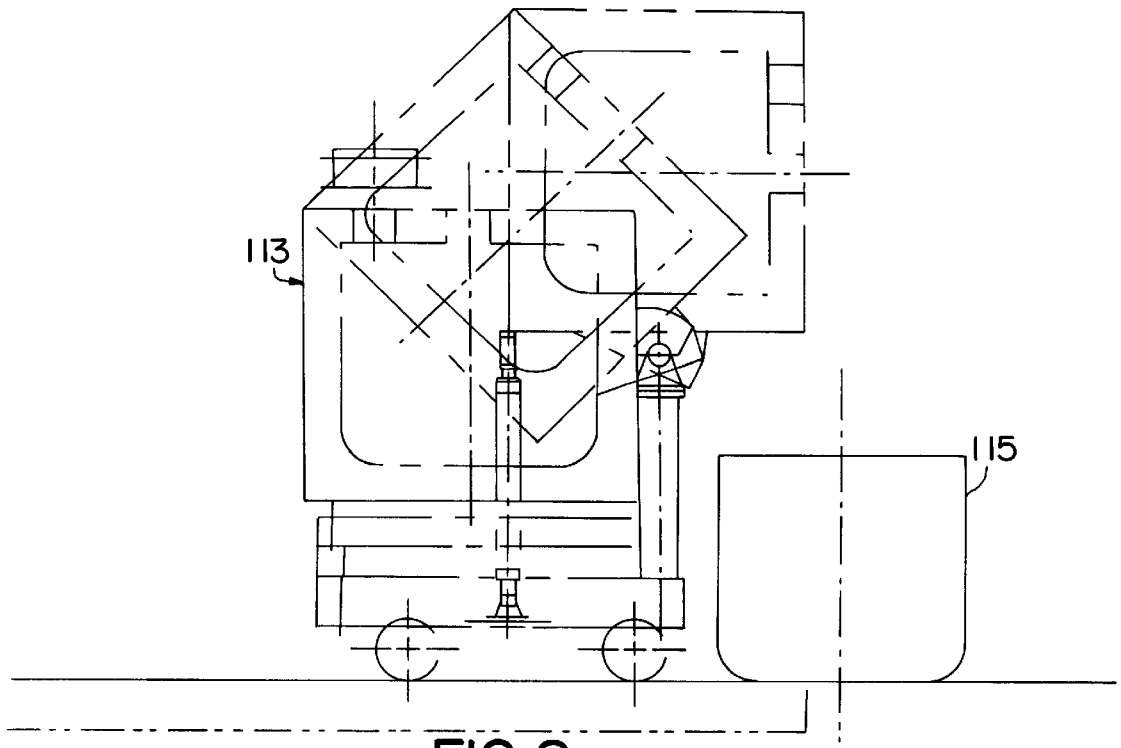
FIG. 8 is a front view showing operations of the melting furnace according to the second embodiment.

As shown in FIGS. 5 through 7, the rotary furnace 101 is constructed to be substantially longitudinal having inlet opening 101*a* and outlet opening 101*b* at opposite ends thereof, and supported by a frame 108 to be rotatable about a cylindrical axis P1. The oxygen type burner 109 for using an oxygen gas having a density of 50% and the fuel (LPG) is provided at the opening 1*a* of the rotary furnace 101 to open and close the opening 101*a* in a well known and suitable manner. The oxygen type burner 109 provides a regulator for regulating a mixing ratio of the fuel (LPG) and the oxygen gas of the predetermined density and also their volumes, and the burner is so constructed as to be controlled by the density measuring instrument for measuring the density of the oxygen gas.

The numeral 110 refers to a transporter or transfer means which is constructed to push the industrial wastes contained in an upper hopper 111 into the rotary furnace 101 by means of an air cylinder. In this case, the cylinder housing a piston of the air cylinder is made of ceramics having a heat resistance. Further, an exhaust duct 112 is arranged to face the opening 101*b* of the rotary furnace 101 and then connected to the preduster 103.

A small melting furnace 113 is disposed beneath the rotary furnace 101 for receiving the ashes and the incombustible materials which are made to fall from the rotary furnace 101 when the rotary furnace 101 is tilted. The melting furnace 113 provides an oxygen type burner 114 using an oxygen gas of more than 50% density and the fuel (LPG). The oxygen type burner 114 is arranged on a lid of the melting furnace, which lid is constructed to be closed and opened, and the burner radiates its flame downward. The burner, however, may be disposed at a suitable position such as the side wall of the melting furnace 113.

The melting furnace 113 is mounted on a base cart having wheels to move on the rails, so that the molten materials or slag may be moved to another place where they can be cast in the form of granules or collets with sudden cooling treatment. FIG. 8 shows a state of discharging the molten materials or slag into a ladle 115 at the destination.

Incineration and melting of the wastes are carried out as follows.

First, the wastes are introduced by means of the transporter 110 into the rotary furnace 101 from the opening 101*a*.

Then, the opening 101*a* is closed by the burner 109 and the combustible materials of the wastes are incinerated with the fuel of LPG and the oxygen gas having a density of more than 50%. The combustible materials are burnt and the ashes thereof and the incombustible materials of the wastes are stored in the rotary furnace 101. The heating powers of the combustible materials and the fuel for the burner 109 preheat the incombustible materials for melting.

The exhaust gas generated in the incineration process is introduced to the dust collector 102 having a bag-filter, via the duct which is connected to the opening 101*b* of the rotary furnace 101, and then discharged in the air. The density of oxygen in the exhaust gas of the rotary furnace is maintained at a level that exceeds 6% (which is the guideline of the Japanese Ministry of Health and Welfare). At the same time, the value of CO in the exhaust gas may be lowered to a level under 50 ppm, which level is also set in the guidelines of the Ministry of Health and Welfare.

After the incineration, the burner 109 is inactivated and removed from the rotary furnace 101 and the rotary furnace 101 is tilted for transferring the ashes and the incombustible materials (metals and sludge) into the melting furnace 113 at the high temperature of about 300° C.~600° C.

In the melting furnace 113, a burner 114, which provides a mechanism for spraying an oxygen gas having a density of more than 50%, and a regulator for mixing the fuel of LPG and the oxygen gas, heats the ashes and incombustible materials at the very high temperature of about 1,500° C. to 1,600° C., so as to melt these materials. Incineration using a high density of oxygen gas (more than 50% density) tends to keep the density of oxygen in the melting furnace 113 at a higher level, so as to greatly reduce generation of CO.

As mentioned above, since the ashes and incombustible materials are preheated in the rotary furnace 101 and are continued to be heated in the melting furnace 113, the external fuel cost for melting can be reduced by 30–40%, in comparison with a conventional system in which the wastes and incombustible materials are once cooled to room temperature and then reheated for melting.

Further, at the time of melting, glass collets are introduced in order to give a sufficient strength to the molten materials or slag necessary for forming, for example, dressing tiles for a pavement. The ratio of the glass collets to the molten materials is 1 to 3 preferably. However, the ratio may be altered, if desirable, to, for example, 4 to 1, 1 to 1, or 1 to 3.

A hood and a duct are provided on the melting furnace 113 and the exhaust gas is introduced therefrom to the preduster 103 of the dust collector 102 for dust collection, and the cleaned gas through the dust collection process is discharged in the air. Further, generation of CO may be reduced greatly with the incineration utilizing the oxygen gas of high density.

Where an inert gas such as nitrogen is used in combination with the oxygen gas of 50% density, it becomes possible to produce an ambient atmosphere in which it is difficult to generate a chemical reaction. As the result, it is expected to greatly lower the generation of dioxins, which are produced under many kinds of conditions.

What is claimed is:

1. A method of incinerating and melting wastes comprising the steps of
   introducing waste by means of a waste introducing means into an inlet end of a horizontal rotary and vertically tiltable furnace, said furnace including an outlet at an opposite end of said furnace from said inlet end,
   incinerating the wastes at a temperatures of from 800° C. to 1,200° C., by means of an oxygen type burner,
   admitting an oxygen gas-fuel mixture having an oxygen content of at least 50% into said furnace so as to reduce a volume of the wastes, during rotation of said furnace,
   introducing additional waste into said furnace and incinerating the same,
   repeating introduction of waste into the furnace and incineration thereof for a plurality of times to provide a pool of waste ashes and particles in said furnace,
   melting the waste ashes and particles pooled in the rotary furnace at a high temperature of more than 1,600° C., to vitrify the ashes and particles,
   introducing an exhaust gas generated in the incinerating and melting processes from said outlet opening of said furnace to a dust collector for cleaning the exhaust gas,
   tilting the furnace from a horizontal position to a vertical position and discharging the vitrified ashes and particles from the furnace.

2. The method of incinerating and melting wastes as claimed in claim 1, further comprising the step of:
   adding at least a soda ash into the furnace at a time of melting the waste ashes and particles.

3. The method of incinerating and melting wastes as claimed in claim 1, further comprising the step of:
   adding at least one of a solid fuel selected from coke, coal or charcoal in the form of powder or a lump, prior to the incinerating step or the melting step for assisting the incineration or melting.

4. The method of incinerating and melting wastes as claimed in claim 2, further comprising the step of:
   adding at least one of a solid fuels selected from coke, coal or charcoal in the form of powder or a lump, prior to the incinerating step or the melting step for assisting the incineration or melting.

5. A method of incinerating and melting wastes comprising the steps of:
   introducing wastes into an inlet end of a horizontally disposed rotary furnace which is tiltable vertically, by means of a waste introducing means, said furnace including an outlet at an opposite end of said furnace from said inlet end,
   incinerating the wastes at a temperature of from 800° C. to 1,200° C., by means of an oxygen type burner admitting an oxygen gas-fuel mixture having an oxygen content of at least 50% into said furnace so as to reduce a volume of the waste during rotation of said furnace,
   introducing additional waste into said furnace and incinerating the same,
   repeating introduction of waste into the furnace and incineration thereof for a plurality of times to provide a pool of waste ashes and particles in said furnace,
   tilting the furnace to a vertical position and transferring the ashes of the waste and particles to a melting furnace,
   melting the waste ashes and the particles at a high temperature of more than 1,600° C., to vitrify the ashes and particles to a molten product,
   introducing an exhaust gas generated in the incinerating and melting processes from said outlet of said rotary furnace and an opening of the melting furnace to a dust collector for cleaning the exhaust gases, and
   discharging the molten product to a disposal means.

6. An apparatus for incinerating and melting wastes comprising:
   a cylindrical, rotary furnace rotatable about a horizontal axis thereof and tiltable about the horizontal axis along a vertical axis which crosses the horizontal axis at a right angle, said rotary furnace having an inlet opening at one end and an outlet opening at an opposite end,
   waste introducing means for transferring and supplying wastes into the rotary furnace through said inlet opening, so as to incinerate the wastes,
   an oxygen type burner for using an oxygen gas-fuel having an oxygen content of at least 50% of the mixture,
   said oxygen type burner being provided at one end of said furnace and movable relative to said horizontal axis to open said inlet opening of said furnace to admit said waste and to close said inlet opening of said furnace to incinerate the waste, said burner being constructed and operated to incinerate the waste at a temperature of from about 800° C. to about 1200° C. and to melt the ashes of the wastes at a temperature of more than 1,600° C., to vitrify the waste, and
   a dust collector connected to an exhaust duct which is connected to said outlet opening of the rotary furnace for cleaning an exhaust gas generated during incineration and melting the waste.

7. The apparatus for incinerating and melting wastes as claimed in claim 6, wherein at least a soda ash is added to the waste at a time of incineration or melting the wastes.

8. The apparatus for incinerating and melting wastes as claimed in claim 6, wherein at least one of a group of solid fuels selected from a group consisting of coke, coal and charcoal in the form of a powder or a lump, is added prior to incinerating or melting the waste.

9. The apparatus for incinerating and melting wastes as claimed in claim 7, wherein at least one of a group of solid fuels selected from a group consisting of coke, coal and charcoal in the form of a powder or a lump, is added prior to incinerating or melting the waste.

10. The apparatus for incinerating and melting wastes as claimed in claim 6, further comprising:

a crusher for crushing the wastes prior to introducing the waste into the furnace.

11. The apparatus for incinerating and melting wastes as claimed in claim 7, further comprising:

a crusher for crushing the wastes prior to introducing the waste into the furnace.

12. The apparatus for incinerating and melting wastes as claimed in claim 8, further comprising:

a crusher for crushing the wastes prior to introducing the waste into the furnace.

13. The apparatus for incinerating and melting wastes as claimed in claim 9, further comprising:

a crusher for crushing the wastes prior to introducing the waste into the furnace.

* * * * *